United States Patent Office 3,001,183
Patented Sept. 19, 1961

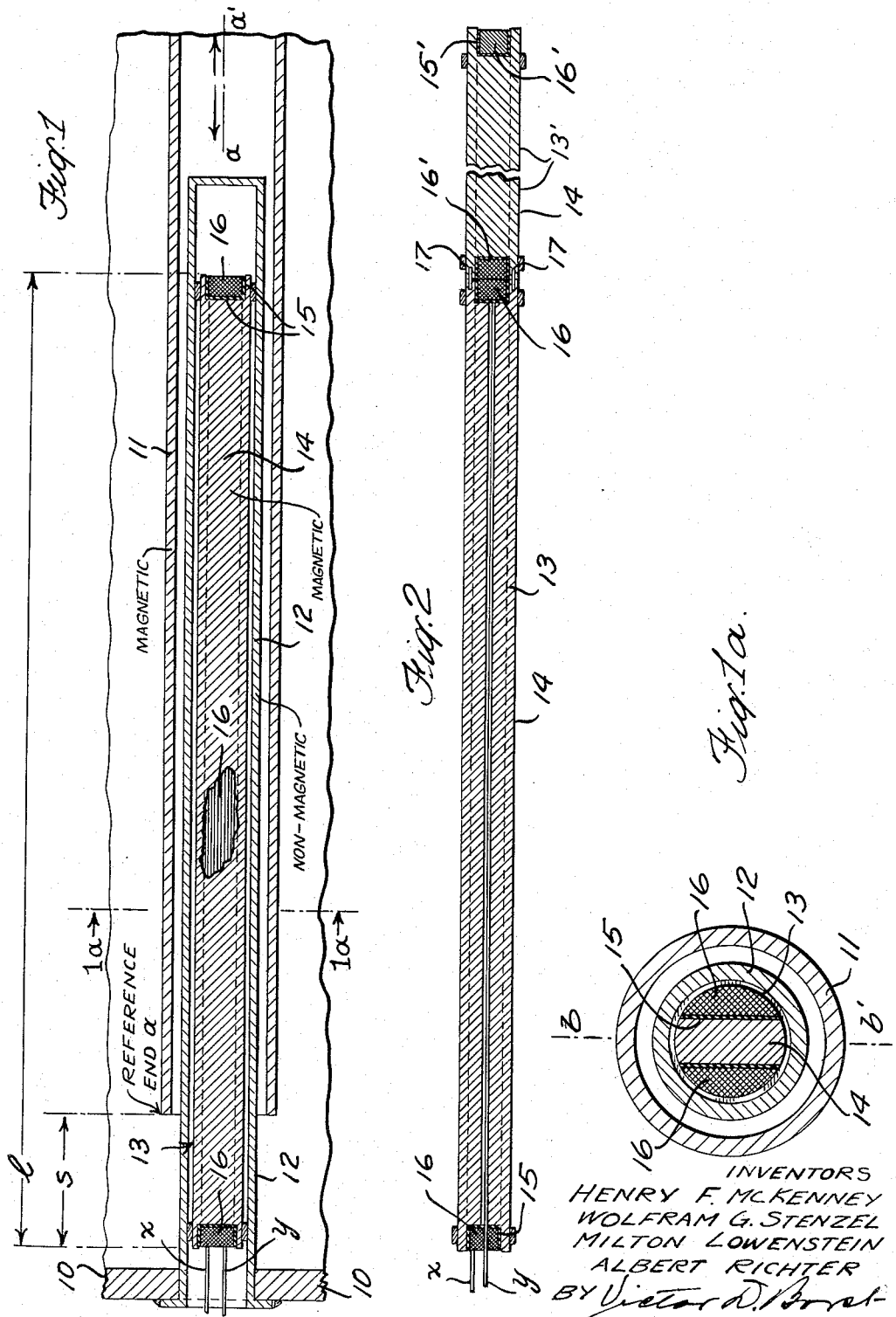

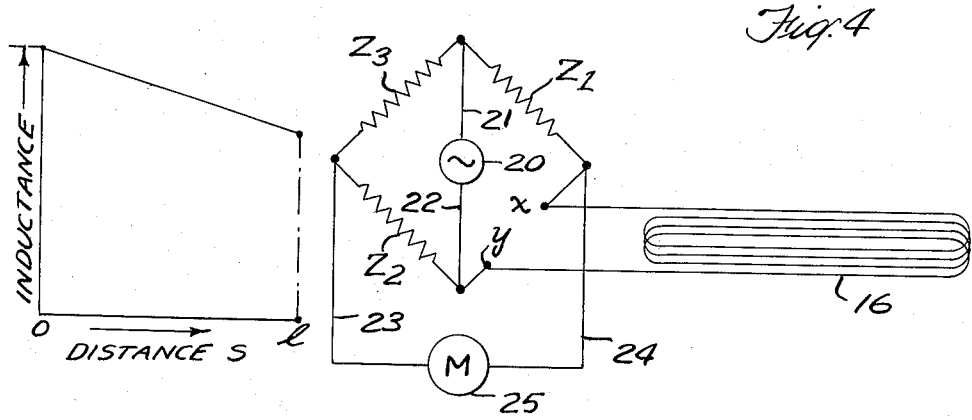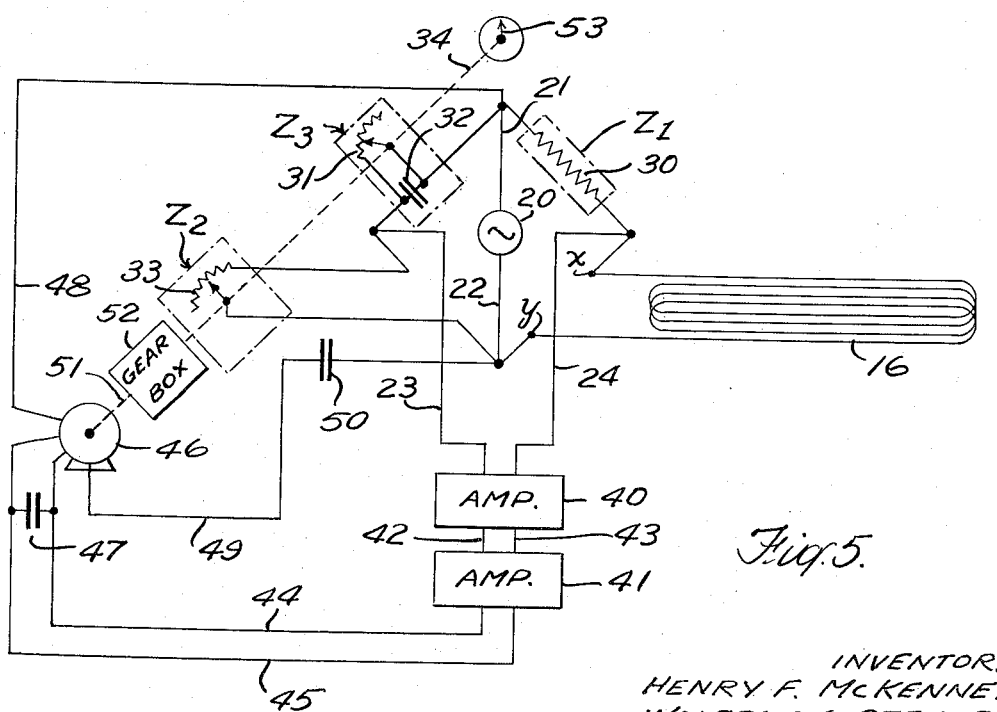

3,001,183
REMOTE INTERNAL LINEAR POSITION INDICATOR
Henry F. McKenney, Weston, Mass., and Wolfram G. Stenzel, Bellerose, Milton Lowenstein, New York, and Albert Richter, Lynbrook, N.Y., assignors to Ford Instrument Company, Division of Sperry Rand Corporation, Long Island City, N.Y., a corporation of Delaware
Filed Nov. 5, 1956, Ser. No. 620,554
1 Claim. (Cl. 340—195)

This invention relates to position indicator systems for sliding magnetic sleeves operating within a completely enclosed vessel and more particularly to a remote linear position indicator having a sensing element positioned within a tubular magnetic well.

The monitoring of the position of an adjustable magnetic sleeve within a closed vessel can be accomplished by shafts passing through mechanical seals in the walls of the container. Any seal, however, will have some leakage especially as it wears with use. Preferably, mechanical seals should be avoided and the shell of the vessel should be welded at all joints and seams. Magnetic means have been employed by others to detect the position of a magnetic tube inside a non-magnetic stainless steel welded container by the use of a solenoid coil located outside of and wound coaxially with the magnetic tube. Such a configuration adds considerably to the diameter of the magnetic tube arrangement. Also errors associated with lack of sensitivity in the indicating system are introduced by the coaxial solenoid coil inducing eddy currents of considerable magnitude in the stainless steel container wall.

As presently contemplated in the embodiments of this invention there is provided a sensing coil wound upon a core which is positioned internally within the tubular magnetic sleeve. For the requirement where the vessel must be sealed completely by welding, a stainless steel tubular well projecting into the tubular magnetic sleeve is welded to the vessel wall and the sensing element comprising a coil and a core is disposed within the stainless steel well. In this embodiment of the invention the sensing element is not physically exposed to the process within the sealed vessel. With the orientation of the axis of the coil perpendicular to the axis of the sleeve and well, the paths for the eddy currents in the metallic well which are induced by alternating currents flowing in the sensing coil are along the longitudinal axis. These paths are considerably longer than the circumferential paths which result for the eddy currents when the sensing coil is normally positioned to be coaxial with the sleeve and well. Since the magnitude of the flow of eddy currents directly masks the change of inductance of the sensing element as influenced by a change in the position of the tubular magnetic sleeve, the resulting smaller eddy currents will permit a greater sensitivity in locating the position of magnetic sleeve by inductance measurements. The inductance measurements of the sensing element are made by a stable network employing balanced and unbalanced means to directly indicate sleeve positions. In the unbalanced bridge means, the error voltage directly conveys the change in inductance and thereby the change in sleeve position. In the balanced bridge means, a servo mechanism maintains the bridge in a state of zero error current and a servo position indicator is employed to indicate tube positions.

The features of the invention will be understood more clearly from the following detailed description taken in conjunction with the accompanying drawings, in which:

FIG. 1 is a cross-sectional view of a protected sensing element inductively related to a tubular magnetic rod which operates with sliding motion within a sealed vessel;

FIG. 1a is a cross-sectional view taken on plane 1a—1a of FIG. 1;

FIG. 2 is a cross-sectional view of an alternate form of the sensing element;

FIG. 3 is a diagram showing the variation of the inductance of the sensing element with change in position of the tubular magnetic sleeve;

FIG. 4 is a schematic diagram of a remote linear sleeve position indicator system employing an unbalanced bridge network; and FIG. 5 is a schematic diagram of a remote linear sleeve position indicator system employing a servo balanced Maxwell bridge circuit.

Referring to FIGS 1 and 1a, there is provided a sealed vessel 10 enveloping a tubular magnetic sleeve 11 which is movable within pre-established limits along its longitudinal axis $a$—$a$. A non-magnetic stainless steel well tubular 12 welded to vessel 10 is positioned internally within the magnetic sleeve 11 so that its longitudinal axis coincides with the axis $a$—$a$. Mounted within the well 12 is a sensing element 13 having a length which is such that the outer reference end $a$ of the sleeve cannot pass beyond either end of the element 13 as a consequence of its displacement within the pre-established limits. Sensing element 13 comprises a magnetic core 14 insulated with a non-conducting material 15 and a coil 16 having terminal $x$ and $y$ wound lengthwise upon the core 14 so that the axis $b$—$b'$ of the coil 16 is positioned perpendicular to the tabular sleeve axis $a$—$a'$. In applications where the magnetic sleeve has large displacement limits which require a long sensing element, FIG. 2 discloses an alternate element construction in which two short sensing elements 13 and 13' are butted and fastened end to end by pins 17. The two coils 16 and 16' are similarly sensed, their axes being parallel, and connected in series to the terminals $x$ and $y$.

FIG. 3 is a diagrammatic representation of the variation of inductance for the sensing elements disclosed in FIGS. 1 and 2. When the distance S between the outside end of sensing element 13 and the outer reference end $a$ of the tubular magnetic sleeve is zero, the inductance of the sensing element is a maximum. When the distance S is equal to or greater than the length 1 of the sensing element, the inductance is a minimum. For the sensing elements disclosed in FIGS. 1 and 2, the variation of inductance between maximum and minimum values is essentially linear, neglecting small errors due to end effects.

In FIG. 4 is disclosed a remote linear sleeve position indicating system employing the coil 16 of the sensing element 13 as one arm of a bridge network comprising an impedance $Z_1$ as the other arm and impedances $Z_2$ and $Z_3$ as the ratio pair of arms in the network. The pair of opposite bridge junction points including the junction point between impedances $Z_1$, and $Z_3$ is connected across an alternating voltage source 20 by conductors 21 and 22. The other pair of opposite junction points is connected by conductors 23 and 24 to a meter 25 having a voltage sensitive element. The bridge network can have any conventional circuitry such as the Wheatstone, Maxwell or the Owen bridge and the impedances of the arms $Z_1$, $Z_2$ and $Z_3$ are selected to produce a null reading on the meter 25, when the end of the tubular magnetic sleeve 11 coincides with the inner end of sensing element 13. Any movement of the tubular magnetic rod will then unbalance the bridge and the amount of error voltage as indicated on the meter 25 can be calibrated in displacement of the sliding sleeve provided that the voltage and frequency of alternating source 20 is held constant.

FIG. 5 discloses a balanced bridge remote linear sleeve position indicating system which is not sensitive to the frequency and voltage magnitude of alternating voltage source 20. In the illustrated schematic diagram the sensing coil 16 is connected to a Maxwell bridge which is maintained balanced by a servo-motor mechanism. Compared to the general bridge network of FIG. 4, $Z_1$ is a resistor 30, $Z_3$ is a resistive potentiometer 31 shunted by a capacitor 32 and $Z_2$ is a resistive potentiometer 33. The rotating arms of the potentiometers 31 and 33 are mechanically connected to a common shaft 34 and these potentiometers are constructed to change their respective resistances proportionally by any displacement of shaft 34. When the bridge network is unbalanced, any error voltage appearing across conductors 23 and 24 is connected to the input of a high gain amplifier 40. The output of high gain amplifier 40 is connected to the input of a power amplifier 41 by a pair of conductors 42 and 43. The output of the power amplifier 41 is connected by conductors 44 and 45 to the control winding of a two phase servo motor 46. As in the conventional manner for energizing the two phase servo motor 46, a capacitor 47 shunts its control winding and its line phase winding is connected across the alternating source 20 by a pair of conductors 48 and 49, the latter conductor including a capacitor 50. The shaft 51 of the servo motor 46 is connected to the shaft 34 through a gear reducer 52 and a mechanical indicator 53 is connected to the shaft 34. For a zero reference position of the end of the tubular magnetic rod relative to one end of sensing element 13 and with the shaft 51 of the motor 46 temporarily disengaged from the gear reducer 52, shaft 34 is adjusted so that the bridge network is balanced and the shaft 51 of the motor 46 is motionless. The motor shaft 51 is then engaged with gear reducer 52 and a zero reference point is marked on the indicator 53 corresponding to its pointer position. When the tubular magnetic sleeve 11 is displaced from the zero reference position the error voltage across conductors 23 and 24 is amplified by amplifiers 40 and 41 and the motor 46 will be energized. All electrical circuit elements and mechanical components are selected so that the turning of the motor shaft 51 in the direction controlled by motor 46 will adjust the potentiometers 31 and 33 to a new bridge network balance. For the designs of the sensing element as disclosed in FIGS. 1 and 2, the displacement of the quiescent positions of shaft 34 as measured by indicator 53 will be directly proportional to the displacement of the tubular magnetic sleeve 11. A mathematical analysis indicates that two dependent balances are required to nullify the potential across conductors 23 and 24. For one condition, the inductance of coil 16 has to be balanced by the resistance setting of the potentiometer 33. For the other condition of balance:

$$\frac{\text{Resistance of Potentiometer 31}}{\text{Resistance of Potentiometer 33}} = \frac{\text{Resistance of Resistor 30}}{\text{Resistance of coil 16}}$$

With an essentially constant sensing coil resistance, it is apparent that the two required dependent balances can be effected by driving both potentiometers at the same speed from a common shaft until both conditions are satisfied. The use of two potentiometers on a common shaft permits the employment of a servo motor for a single balance unit to provide the two dependent balances.

In more general applications which do not require a completely sealed vessel, it is apparent that the stainless steel well can be omitted. It is to be understood that various modifications of the invention other than those above disclosed may be effected by persons skilled in the art without departing from the principle and scope of the invention as defined in the appended claim.

What is claimed is:

A position indicator of the character described comprising an elongated non-magnetic tubular well having closed and open ends and a longitudinal axis; means mounting said well in fixed position in a sealed vessel with the open end thereof secured to the wall of said vessel; a tubular magnetic sleeve disposed about said well, coaxially therewith, for longitudinal back and forth movement along said well between pre-established inner and outer limits of movement adjacent the closed and open ends respectively of said well; an elongated inductive sensing element comprising an elongated magnetic core, having a longitudinal axis, and a single coil which is wound lengthwise on said core from end to end thereof with the axis of said coil disposed perpendicular to the longitudinal axis of said core; said sensing element being mounted in fixed position in said well with their axes coaxial, the length and position of said sensing element within said well being such that one end thereof is disposed substantially coincident with the outer limit of movement of the outer reference end of said sleeve, and the other end thereof is disposed substantially coincident with the inner limit of movement of the outer reference end of said sleeve; the back and forth movement of said sleeve along said well varying the inductance of said sensing element in accordance with the position of the outer reference end of said sleeve with respect to said one end of said sensing element; and means by which the inductance variation of said sensing elements is sensed to thereby indicate the position of the outer reference end of said sleeve.

References Cited in the file of this patent

UNITED STATES PATENTS

| | | |
|---|---|---|
| 2,208,910 | Pampel | July 23, 1940 |
| 2,215,148 | Ehrler | Sept. 17, 1940 |
| 2,261,541 | De Sart | Nov. 4, 1941 |
| 2,569,106 | James | Sept. 29, 1951 |
| 2,708,730 | Alexander et al. | May 17, 1955 |
| 2,790,140 | Bender | Apr. 23, 1957 |

FOREIGN PATENTS

| | | |
|---|---|---|
| 737,882 | Germany | June 24, 1943 |